Figure 1:
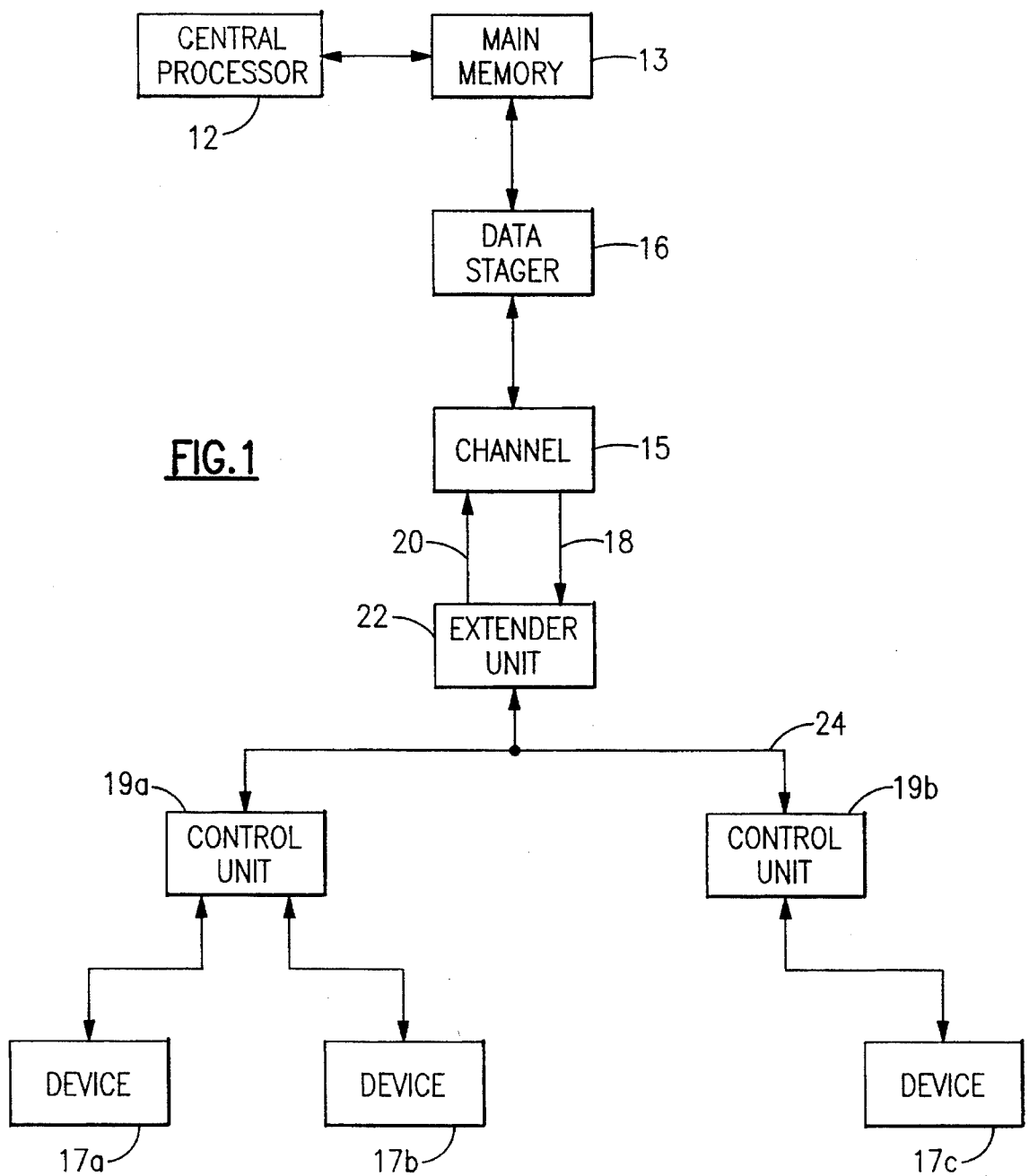

United States Patent [19]

Carey et al.

[11] Patent Number: 5,559,972
[45] Date of Patent: Sep. 24, 1996

[54] METHOD AND APPARATUS FOR SUPPORTING BYTE-MODE DEVICES AND NON-BYTE-MODE DEVICES ON A BUS

[75] Inventors: Maurice E. Carey, Kingston; Gerald H. Miracle, Pleasant Valley; James T. Moyer, Endwell; Richard A. Neuner, Port Ewen, all of N.Y.

[73] Assignee: International Business Machines Corporation, Armonk, N.Y.

[21] Appl. No.: 981,930

[22] Filed: Nov. 24, 1992

Related U.S. Application Data

[63] Continuation of Ser. No. 392,629, Aug. 11, 1989, abandoned.

[51] Int. Cl.$^6$ .................................................. G06F 13/42
[52] U.S. Cl. ................................. 395/281; 364/DIG. 1
[58] Field of Search .................................. 395/500, 325; 370/60, 61, 95.2

[56] References Cited

U.S. PATENT DOCUMENTS

| | | |
|---|---|---|
| 4,156,111 | 5/1979 | Downey et al. . |
| 4,205,200 | 5/1980 | Parikh et al. . |
| 4,396,984 | 8/1983 | Videki, II .................. 395/275 |
| 4,423,480 | 12/1983 | Bauer et al. ................ 395/325 |
| 4,425,664 | 1/1984 | Sherman et al. .................. 375/8 |
| 4,453,211 | 6/1984 | Askinazi et al. .............. 395/500 |
| 4,463,421 | 7/1984 | Laws .............................. 395/325 |
| 4,494,194 | 1/1985 | Harris et al. ................... 364/200 |
| 4,571,671 | 2/1986 | Burns et al. . |
| 4,577,317 | 3/1986 | Chu et al. ..................... 370/110.1 |
| 4,623,997 | 11/1986 | Tulpule .............................. 370/85 |
| 4,712,176 | 12/1987 | Fredericks et al. ............. 395/325 |
| 4,787,029 | 11/1988 | Kahn .............................. 395/325 |
| 4,807,180 | 2/1989 | Takeuchi et al. . |
| 4,837,680 | 6/1989 | Crockett et al. ................ 395/325 |
| 4,841,475 | 6/1989 | Ishizuka . |
| 4,860,200 | 8/1989 | Holmbo ........................... 395/725 |
| 4,866,609 | 9/1989 | Calta et al. ..................... 364/200 |
| 4,878,173 | 10/1989 | Gockjian ......................... 364/200 |
| 4,939,735 | 7/1990 | Fredericks et al. ............ 371/47.1 |
| 4,947,366 | 8/1990 | Johnson .......................... 395/275 |
| 4,959,833 | 9/1990 | Mercola et al. .................. 371/32 |
| 4,975,869 | 12/1990 | Ammann et al. .............. 395/575 |
| 5,023,829 | 6/1991 | Shibata ............................ 395/775 |

FOREIGN PATENT DOCUMENTS

| | | |
|---|---|---|
| 0242634 | of 0000 | European Pat. Off. . |
| 89/02633 | 3/1989 | WIPO . |

OTHER PUBLICATIONS

Lynch, K. R. and Thorn, C. A., "Serial Channel to I/O Interface," *IBM Technical Disclosure Bulletin*, vol. 19, No. 8, Jan. 1977, pp. 3139–3143.

*Primary Examiner*—William M. Treat
*Attorney, Agent, or Firm*—Floyd A. Gonzalez

[57] ABSTRACT

In a data processing system in which an extender unit interconnects the parallel bus of a control unit and a serial link of an extender channel, the channel and the extender unit send and receive serial frames that permit the extender unit to operate under the protocol of the parallel bus with either byte mode devices or non-byte mode devices. The control unit can be modified to operate with a byte mode device in data streaming, a high speed data transfer mode.

10 Claims, 1 Drawing Sheet

METHOD AND APPARATUS FOR SUPPORTING BYTE-MODE DEVICES AND NON-BYTE-MODE DEVICES ON A BUS

This is a continuation of application Ser. No. 07/392,629 filed on Aug. 11, 1989, now abandoned.

RELATED APPLICATIONS

An application of Casper, Flanagan, Miracle, Neuner and Potvin, Ser. No. 07/392,754 entitled Apparatus for Interconnecting a Control Unit having a Parallel Bus with a Channel having a Serial Link (docket number KI9-89-014), filed on the same day as this application, describes a serial frame protocol that is used by the extender channel and extender unit of this invention. This application is incorporated by reference.

An application of Minassian, Miracle, Neuner and Potvin, Ser. No. 07/392,867 (docket number KI9-89-012), filed on the same day as this application, now U.S. Pat. No. 5,133,078 issued Jul. 21, 1992 for Serial Frame Processing System in which Validation and Transfer of a Frame's Data from Input Buffer to Output Buffer Proceed Concurrently, is also related.

FIELD OF THE INVENTION

This invention relates to data processing apparatus and more specifically to an extender unit that interconnects a control unit and a channel.

Overview of an I/O Subsystem with an Extender Unit

The general organization of an I/O subsystem is well known, and the extender unit is described in Casper et al., but it will be helpful to summarize the features and terminology that particularly apply to this invention. In a system without an extender unit, the path for data transfers between an I/O device and main processor memory, traced from the device to memory, includes a control unit, a serial link or a parallel bus, a channel, a data stager, and a component that connects the data stager and the central processors to the memory. The memory holds the data of a data transfer, and it also holds a channel program and control blocks with information about an I/O device and about a current data transfer. The control unit adapts the general command structure of the channel to the specific requirements of a particular device.

If the channel and the control unit are interconnected by a serial link, the link carries serial frames with data and control information. If the channel and control unit are interconnected by a parallel bus, data transfers proceed according to a protocol that is called the OEMI protocol (the term is from a related publication cited in Casper et al.) An extender unit is connectable between the serial link of a channel and the parallel bus of a control unit. The parallel bus has two sets of lines for transferring bytes between the channel and the control unit and other lines, called tag lines, that control these transfers. The protocol of the extender unit bridges the serial frame protocol of a serial channel and the OEMI protocol of a parallel bus control unit.

In the terminology of Casper et al., a channel that is connected to a control unit by the parallel bus is called a parallel channel, and a channel that is connected to a control unit by a serial link is called a serial channel. A channel becomes a serial channel or an extender channel when the appropriate microcode is loaded.

This summary of the extender channel and the extender unit should be sufficient for understanding the preferred embodiment of this invention. See Casper et al. for a discussion of prior art parallel bus extenders, citations to publications about the OEMI bus and the architecture of the I/O subsystem, and a detailed description of the structure of all of the frames used by the extender channel and extender unit, including particular frame structures that are part of this invention.

Byte Mode and Non-Byte Mode Devices

From the standpoint of this specification, devices and their control units are characterized in two ways: how they connect to and disconnect from the parallel bus and how data bytes are transferred on the parallel bus. Control units and devices ordinarily remain physically connected; in an operation called initial selection, one of several devices and an associated control unit become logically connected to a bus and the associated channel. When the device and its control unit disconnect, some other device can connect to the same bus and channel.

Byte mode devices (also called byte multiplex devices) can disconnect after a byte has been transferred or after initial selection (and before any byte has been transferred). Typically a byte mode device transfers one byte and then disconnects. Non-byte mode devices (some of which are called burst mode devices) remain connected through an entire operation.

Data Transfer Modes

Some data transfers on the parallel bus are interlocked. For each byte, the control unit raises a tag called Service In (or a related tag called Data In) and the channel raises a tag called Service Out (or the related tag Data Out). In a data transfer mode called data streaming, the control unit and the channel raise these tags when a byte is sent or received, but the tags are not required to overlap in time. In data streaming, these tags are counted by the control unit and the counts for in tags and out tags are compared to check that no byte has been lost and the result is sent to the channel.

Commonly, a slow device such as a card punch operates in byte mode and in interlocked mode. A fast device such as a magnetic disk drive commonly operates in non-byte mode and data streaming mode. Other combinations are useful with some devices. For example, a byte mode device might connect to receive a command, disconnect to perform a preliminary operation such as filling a buffer for a read operation, and then reconnect to transfer data at a high rate in data streaming mode.

SUMMARY OF THE INVENTION

One object of this invention is to provide an extender unit that operates with either byte mode or non-byte mode devices, as some parallel channels have operated in the prior art. Some of the frame structure which is set out in Casper et al. will be described here for operations of the extender channel and the extender unit that permit the extender unit to operate in either byte mode or non-byte mode.

Another object of this invention is to provide an extender unit that can operate a byte mode device in data streaming mode. Some prior art parallel channels have operated in data streaming mode with byte mode devices. In this invention, the parallel control unit is modified (using a known technique) to delay data streaming while the channel and the extender unit perform operations that are delayed by the time to propogate frames on the serial link.

Other features and objects of the invention will be apparent from the description of our preferred embodiment.

THE DRAWING

FIG. 1 is a diagram showing the extender channel, the extender unit, and the control unit of this invention.

THE PREFERRED EMBODIMENT

The System of FIG. 1

FIG. 1, which is identical to FIG. 1 of Casper et al., shows a representative central processor 12, a main memory 13, a representative channel 15, a data stager 16 that interconnects channel 15 and other channels (not shown) with main memory, representative I/O devices 17a, 17b, 17c, representative control units 19a, 19b connected to the devices, and the extender unit 22. (Processor 12, main memory 13 and data stager 16 may collectively be regarded as the "host processor" from the standpoint of the channel 15.) The extender unit is connected to the control units by a parallel bus 24 and is connected to the channel by a bidirectional serial link 18, 20.

It will be helpful to assign arbitrary connection types and data transfer types to the devices and their control units. Control unit 19a and its devices 17a and 17b operate in byte mode and control unit 19b and its device 17c operate in non-byte mode. (Byte mode control units typically operate with more than one device, but the number of devices connected to each control unit in the drawing is not significant.) Byte mode device 17a operates in interlocked mode and byte mode device 17b operates in data streaming modes. Control unit 19a is preferably modified for operation in data streaming mode, as will be described later, but the devices and their control units are otherwise conventional according to the OEMI protocol.

The Serial Frame Format

A frame on serial link 18, 20 has one or more bytes called frame contents bytes, and appropriate start-of-frame bytes and end-of-frame bytes. Both the channel and the extender unit transmit idle characters when they are not transmitting frames. One of the frame contents bytes identifies the frame as one of several frame types: a Data frame, a Control frame, a Test frame, a Command frame, and a Status frame. Some bytes carry flags or codes, and some bytes carry other information. The frame structure is defined in detail in the application of Casper et al. but the frames will be described as they appear in the examples of data transfers under this protocol.

Initial Selection and Disconnect

A series of steps are performed on the parallel bus to select a particular I/O device for a data transfer or other operation. In this sequence, the control unit receives a command byte from a CCW and it returns a status byte which tells whether the device can perform the command. As part of the initial selection sequence, Select Out and Hold Out are raised on the bus and the control unit raises Operational In. After the device has been selected, it can not disconnect until Select Out and Hold Out fall. Conventionally, a channel operating with a byte mode device drops Hold Out and Select Out after initial selection, and the device may disconnect. A channel operating with a non-byte mode device does not drop these tags until the data transfer has been completed and the control unit presents the device ending status.

For initial selection, the extender channel and the extender unit cooperate to produce this conventional operation on the parallel bus. Casper et al. gives a detailed example.

The extender unit 22 includes means for detecting a parameter, or flag (Byte Mode), in a Command frame from the channel 15 and for operating tag lines on the bus 24 to allow the control unit 19a or 19b to disconnect after initial selection if the parameter indicates that the device is a byte mode device; extender unit 22 thus initially selects a byte mode device according to a protocol that permits the device to disconnect as a byte mode device. Extender unit 22 operates the tag lines on the bus 24 to prevent the control unit from disconnecting after initial selection if the parameter indicates that the device is a non-byte mode device.

Device Reconnection

At the beginning of this sequence of steps, the channel is idle—it does not have a Start Subchannel or corresponding instruction to execute. The channel sends an outbound Control frame with the code (hex 0A) for Enable Polling. The following sequence of steps is then performed if a byte mode device is ready to reconnect to continue a byte mode operation.

1. The extender unit raises Select Out and Hold Out, as is standard in the OEMI protocol, and sends the channel an inbound Control frame with the code (hex 82) for Response Executed.

In this example, the control unit is ready to reconnect. It performs the standard steps of blocking Select Out, raising Operational In, putting the device address on Bus In, and raising the tag Address In.

2. The extender unit sends the channel a control frame with the code for Control Unit Connected (hex 8A) and with the device address in the third byte. (Note that the extender unit does not know why the device is connecting. A device can connect on a polling sequence to start a device-initiated operation, to continue an operation in byte mode, or to present secondary status.)

3. The channel accesses main memory to fetch a control block for the device identified by the address in the Control frame.

4. Continuing from step 1, the extender unit puts a byte of all 0 bits on Bus Out and raises Command Out to acknowledge the device address. The control unit drops Address In and the extender unit drops Command Out.

5. The control unit raises Service In or Data In to continue the data transfer. (Service In starts a data transfer in interlocked mode and Data In starts a data transfer in data streaming mode.) The device and control unit are now connected.

6. In response to Service In or Data In, the extender unit sends the channel an inbound Control frame with the code (hex 9A) for Data Reconnect.

After the channel receives the Data Reconnect frame, it performs the following steps.

7. The channel tests a control block in main memory to confirm that the device is a byte mode device.. (If the device is not a byte mode device, there is an error in the configuration tables used by the channel and the operation cannot continue until it is corrected.)

8. If the device is a byte mode device, the channel tests the subchannel for the data transfer mode. If the device is not now in data transfer mode, the channel performs a conventional operation called a selective reset (using a Control frame with code hex 72).

9. If the device is in data transfer mode, then the channel sends the extender unit a Command Update frame containing the active command byte from the subchannel with the device address, the flags, and the parameters that were used when the device was originally selected. One parameter, Byte Mode, is set to show that the device is a byte mode device. If the data transfer is a read operation, then a request for read data can be passed to the extender unit in this Command Update frame or in a subsequent Read Data Request frame. If the data transfer is a write operation, the channel then sends one or more Write Data frames.

10. After the extender unit receives the Command Update frame plus ability to transfer at least one byte of data or END flag, then the extender unit will respond to Service In or Data In with Service Out or Data Out or Command Out (stop).

11. After the device disconnects, the extender sends a Control frame with the code for Control Unit Disconnected (code hex 92). (A control unit does not submit ending status until the data transfer has been completed.) The channel then updates the control block for the device so that the operation can proceed when the device again reconnects. These operations by the extender channel are conventional for parallel channels that are configured to operate with byte mode devices.

Reconnection for Data Streaming

In step 6 the control unit raises Service In to begin the data transfer in interlocked mode or Data In to begin in data streaming mode. In a read operation, the control unit puts the first byte on Bus In. In interlocked mode, the control unit waits until the tag Service Out rises and it then drops Service In. When Service Out falls on the parallel bus, the control unit can put the next byte on Bus In and raise Service In to continue the data transfer. Thus in interlocked mode, the tag sequence provides the delay for steps 6 through 9.

In a read operation in data streaming mode, the control unit puts the second byte on the bus and raises Service In a timed interval after the first byte without waiting for the rise of Data Out on the bus. Preferably the read data transfer does not begin until the steps have been completed as described for the interlocked operation. Consequently, the control unit is modified to transfer the first byte in interlocked mode, as is known in other data transfers.

SUMMARY

From this description of one embodiment of the invention and from the related description in Casper et al. those skilled in the art will recognize modifications of the preferred embodiment within the skill of the art and the spirit of the claims.

Having described our invention, what we claim as new and desire to secure by Letters Patent is:

1. An apparatus for supporting the disconnection of a device after it has transmitted at least one byte of data, said apparatus comprising:

a channel for sending a command frame of serial data, said command frame including a flag having a state indicating that a device may disconnect after the transmission of at least one byte of data;

a serial bus connected to said channel for transmitting frames of serial data to and from said channel;

an extender unit connected to said serial bus, said extender unit having decoding means for decoding said command frame of serial data to detect said flag, and protocol means for conducting a data transmission operation, wherein data is transmitted to and from said channel, in accordance with the state of said flag;

a parallel bus connected to said extender unit, said parallel bus having tag lines connected to said protocol means for conducting said data transmission operation; and a control unit connected to said parallel bus and said tag lines, and having said device connected thereto for sending bytes of data between said extender unit and said device via said control unit, said control unit having tag control means for sending tag signals over said tag lines to said extender unit for signalling disconnection during said data transmission operation after at least one byte of data has been sent to said extender unit via said control unit;

said protocol means detecting said disconnection as indicated by the tag signals on said tag lines and transmitting a serial frame to said channel having a code indicating said disconnection.

2. The apparatus of claim 1 wherein said channel further comprises polling means for sending a polling frame over said serial bus to said extender unit instructing said extender unit to poll said control unit for tag signals showing that said device requests to be reconnected, and said protocol means includes means for sending a data-reconnect frame to said channel when said device requests to reconnect.

3. The apparatus of claim 2 further comprising a main memory accessible by said channel, said main memory having a control block containing control information about said device, said device having address means for sending an address over said parallel channel via said control unit to said extender unit when said device requests to reconnect, said extender unit having means for sending said address to said channel in a control-unit-connected frame, and said channel having means to access said main memory using said address to fetch said control block and examining said control information therein to confirm that said device is allowed to disconnect and reconnect during said data transmission operation.

4. The apparatus of claim 1 further comprising means in said protocol means for controlling said data transfer operation to prevent said device from disconnecting when the state of said flag indicates said device is not allowed to disconnect.

5. The apparatus of claim 4 wherein said channel further includes means for sending a second flag in said command frame having states indicating if the operation of said device is to be in an interlocked mode or a data streaming mode, and said protocol means includes means for conducting said data transmission operation in one of an interlocked mode or a data streaming mode dependent upon the state of said second flag in said command frame.

6. A method for supporting the disconnection of a device after it has transmitted at least one byte of data, said method comprising:

transmitting a command frame of serial data from a channel to an extender unit over a serial bus, said command frame including a flag having a state indicating that a device may disconnect after the transmission of at least one byte of data;

decoding by decoding means in said extender unit, said command frame of serial data for detecting said flag;

conducting a data transmission operation by protocol means in said extender unit in accordance with the state of said flag whereby data is transmitted to and from said channel, said data transmission operation using tag lines in a parallel bus connected to said extender unit and a control unit controlling a device;

sending tag signals over said tag lines from said control unit to said extender unit for signalling disconnection during said data transmission operation after at least one byte of data has been sent from said device to said extender unit via said control unit; and detecting by said protocol means, said disconnection as indicated by the tag signals on said tag lines and transmitting a serial frame from said extender unit to said channel having a code indicating said disconnection.

7. The method of claim 6 further comprising:

sending a polling frame from said channel over said serial bus to said extender unit instructing said extender unit to poll said control unit for tag signals showing said device requests to be reconnected; and sending a data-reconnect frame from said extender unit to said channel when said device requests to reconnect.

8. The method of claim 7 further comprising;

storing a control block containing control information about said device in a main memory accessible by said channel;

sending an address from said device over said parallel channel via said control unit to said extender unit when said device requests to reconnect;

sending said address from said extender unit to said channel in a control-unit-connected frame; and fetching said control block from said main memory by said channel and examining said control information therein to confirm that said device is allowed to disconnect and reconnect during said data transmission operation.

9. The method of claim 6 further comprising;

controlling said data transmission operation with said protocol means to prevent said device from disconnecting when the state of said flag indicates said device is not allowed to disconnect during said data transmission operation.

10. The method of claim 9 further comprising:

sending a second flag in said command frame from said channel, said second flag having states indicating if the operation of said device is to be in an interlocked mode or a data streaming mode; and conducting said data transmission operation by said protocol means in one of an interlocked mode or a data streaming mode dependent upon the state of said second flag in said command frame.

* * * * *